(12) United States Patent
Finch et al.

(10) Patent No.: US 10,164,757 B2
(45) Date of Patent: Dec. 25, 2018

(54) COMMUNICATION APPARATUS

(71) Applicant: BAE SYSTEMS plc, London (GB)

(72) Inventors: Stephen Derek Finch, Chelmsford (GB); Matthew Robert Gore, Chelmsford (GB); Duncan Peter Rowe, Chelmsford (GB)

(73) Assignee: BAE SYSTEMS Plc, London (GB)

( * ) Notice: Subject to any disclaimer, the term of this patent is extended or adjusted under 35 U.S.C. 154(b) by 0 days.

(21) Appl. No.: 15/523,166

(22) PCT Filed: Oct. 26, 2015

(86) PCT No.: PCT/GB2015/053203
§ 371 (c)(1),
(2) Date: Apr. 28, 2017

(87) PCT Pub. No.: WO2016/067004
PCT Pub. Date: May 6, 2016

(65) Prior Publication Data
US 2017/0317811 A1 Nov. 2, 2017

(30) Foreign Application Priority Data
Oct. 31, 2014 (GB) .................................. 1419421.1

(51) Int. Cl.
*H04L 5/14* (2006.01)
*E21B 41/00* (2006.01)
(Continued)

(52) U.S. Cl.
CPC ............ *H04L 5/1461* (2013.01); *E21B 17/01* (2013.01); *E21B 41/0007* (2013.01);
(Continued)

(58) Field of Classification Search
None
See application file for complete search history.

(56) References Cited

U.S. PATENT DOCUMENTS

| 4,532,812 A | 8/1985 | Birchak |
| 4,562,559 A | 12/1985 | Sharp et al. |

(Continued)

FOREIGN PATENT DOCUMENTS

| EP | 0261825 A2 | 3/1988 |
| EP | 0837217 A2 | 4/1998 |

(Continued)

OTHER PUBLICATIONS

International Search Report and Written Opinion received for Patent Application No. PCT/GB2015/053203, dated Apr. 5, 2016. 13 pages.

(Continued)

*Primary Examiner* — Leon-Viet Nguyen
(74) *Attorney, Agent, or Firm* — Fish & Maloney PLLC

(57) ABSTRACT

Communication apparatus comprises a first transceiver unit (205A) and a signal processing device (106) configured to receive a signal from the first transceiver unit and to produce a signal for transmission by the first transceiver unit. A cable (201A) connects the first transceiver unit to the signal processing device. The first transceiver unit comprises a housing; a first pair of transducers (204T, 204R) located at, or adjacent, a first end of the housing, and a second set of transducers (206T, 206R) located at, or adjacent, an opposite end of the housing.

19 Claims, 7 Drawing Sheets

(51) Int. Cl.
  *E21B 47/09* (2012.01)
  *E21B 47/12* (2012.01)
  *E21B 17/01* (2006.01)
  *E21B 47/14* (2006.01)
  *H04L 5/16* (2006.01)

(52) U.S. Cl.
  CPC .............. *E21B 47/09* (2013.01); *E21B 47/12* (2013.01); *E21B 47/14* (2013.01); *H04L 5/16* (2013.01)

(56) References Cited

U.S. PATENT DOCUMENTS

| | | | |
|---|---|---|---|
| 4,675,852 A * | 6/1987 | Russell | E21B 47/187 |
| | | | 181/106 |
| 5,081,406 A * | 1/1992 | Hughes | B23D 59/005 |
| | | | 318/478 |
| 5,592,438 A | 1/1997 | Rorden et al. | |
| 6,648,082 B2 | 11/2003 | Schultz et al. | |
| 6,837,332 B1 * | 1/2005 | Rodney | G01V 1/48 |
| | | | 181/0.5 |
| 7,411,864 B2 | 8/2008 | Hurst et al. | |
| 9,657,563 B2 | 5/2017 | Schuhrke et al. | |
| 2002/0050930 A1 | 5/2002 | Thomeer et al. | |
| 2003/0151977 A1 | 8/2003 | Shah et al. | |
| 2005/0035874 A1 | 2/2005 | Hall et al. | |
| 2006/0221768 A1 * | 10/2006 | Hall | G01V 1/40 |
| | | | 367/82 |
| 2007/0000667 A1 | 1/2007 | MacKenzie et al. | |
| 2008/0247273 A1 * | 10/2008 | Chemali | E21B 17/028 |
| | | | 367/82 |
| 2009/0240705 A1 | 9/2009 | Miloushev et al. | |
| 2010/0117855 A1 * | 5/2010 | Sinclair | G01V 3/28 |
| | | | 340/854.6 |
| 2010/0149914 A1 | 6/2010 | Achanta | |
| 2011/0018735 A1 * | 1/2011 | Garcia-Osuna | G01V 11/002 |
| | | | 340/854.4 |
| 2011/0176387 A1 | 7/2011 | Froelich | |
| 2012/0170410 A1 | 7/2012 | Hay | |
| 2015/0285065 A1 | 10/2015 | Howell et al. | |
| 2017/0317810 A1 | 11/2017 | Gore | |
| 2017/0317811 A1 | 11/2017 | Finch et al. | |

FOREIGN PATENT DOCUMENTS

| | | | |
|---|---|---|---|
| EP | 2204530 A1 | 7/2010 | |
| EP | 2763335 A1 | 8/2014 | |
| GB | 2481699 A | 1/2012 | |
| WO | 0033108 | 6/2000 | |
| WO | 2013057481 A1 | 4/2013 | |
| WO | WO2013/057481 * | 4/2013 | ............ H04B 11/00 |
| WO | 2013185064 A1 | 12/2013 | |
| WO | 2014011823 A1 | 1/2014 | |
| WO | 2014018010 A1 | 1/2014 | |
| WO | 2016067003 A1 | 5/2016 | |
| WO | 2016067004 A1 | 5/2016 | |
| WO | 2016067005 A1 | 5/2016 | |

OTHER PUBLICATIONS

GB Intellectual Property Office Search Report under Section 17(5) received for GB Patent Application No. 1419421.1 dated Apr. 7, 2015. 3 pages.

International Search Report and Written Opinion received for Patent Application No. PCT/GB2015/053204, dated Feb. 12, 2016. 11 pages.

Warthman, Forrest, "Delay- and Disruption-Tolerant Networks: A Tutorial," Jul. 23, 2012. Retrieved from the Internet URL: http://ipnsig.org/wp-content/uploads/2012/07/DTN_Tutorial_v2.05.pdf. 35 pages.

Dunn, Shaun, "Subsea Communications for Solving Real World Problems," Mar. 13, 2014. Retrieved from the Internet URL: http://www.oceanologyinternational.com/_novadocuments/49394?v=6. 38 pages.

Heidemann, et al., "Research Challenges and Applications for Underwater Sensor Networking," Wireless Communications and Networking Conference, 2006. Retrieved from the Internet URL: https://www.isi.edu/~johnh/PAPERS/Heidemann06a.pdf. 8 pages.

Patel, Komal, "Underwater Sensor Networking," IJIRST—International Journal for Innovative Research in Science & Technology, vol. 1, Issue 1, Jun. 2014. pp. 18-21.

International Preliminary Report on Patentability received for Patent Application No. PCT/GB2015/053204, dated May 11, 2017. 8 pages.

International Search Report and Written Opinion received for Patent Application No. PCT/GB2015/053202, dated Jan. 26, 2016. 12 pages.

GB Intellectual Property Office Search Report under Section 17(5) received for GB Patent Application No. 1419420.3 dated Apr. 7, 2015. 3 pages.

International Preliminary Report on Patentability received for Patent Application No. PCT/GB2015/053202, dated May 11, 2017. 8 pages.

GB Intellectual Property Office Search Report under Section 17(5) received for GB Patent Application No. 1419423.7, dated Mar. 10, 2015. 3 pages.

International Preliminary Report on Patentability received for Patent Application No. PCT/GB2015/053203, dated May 11, 2017. 10 pages.

* cited by examiner

COMMUNICATION APPARATUS

The present invention relates to communication apparatus and methods.

Connectors and interconnects for communication apparatus can be very expensive and physically large and so can have a significant effect on the overall system cost, as well as the space required for deployment. Having several components located in difficult environments, e.g. underwater, can also increase the probability of system failure.

Some communication systems comprise acoustic transceiver units and modems for providing data transfer between the mandrel and riser of an oil rig. The mandrel subsystem can have up to 30 transceivers and the riser up to 10 transceivers. In order to reduce the number of connectors and interconnects, a "daisy chain" design has been adopted, with a chain of transceiver units being connected to each other via cables, and the transceiver unit at one end of the chain being connected to the modem via a cable.

This design does, however, result in a system with inherently more noise. As each transceiver unit is added, additional noise is added, whereas there is only one signal. This results in a system with one signal (or perhaps two signals) being detected, but with N noise signals, where N is the number of transceiver units (more than one signal is possible as the signal levels are large enough to reach more than one transceiver). In the transceiver unit design there is a pair of transducers at each end of the transceiver unit, each manufactured from a single piezoelectric element. One transducer in each pair functions as a transmitter (Tx) and the second as a receiver (Rx).

Measurements for an example system were taken using an acoustic uplink through fluid (between the mandrel and riser), with the downlink using a wired link directly between the modems. This arrangement appeared to give good overall performance, however, when the acoustic downlink was also introduced the performance degraded drastically. The cause of the loss in performance was identified as noise from the inactive half-duplex transmitter of one transducer pair coupling strongly with the active half-duplex receiver of the other transducer pair, reducing the signal-to-noise to below an acceptable level. This problem was evident with just a single transceiver unit. A full mandrel subsystem typically having 30 transceiver units further magnifies the problem.

Embodiments of the present invention are intended to address at least some of the above problems.

According to one aspect of the present invention there is provided communication apparatus comprising:

a first transceiver unit;

a signal processing device configured to receive a signal from the first transceiver unit and to produce a signal for transmission by the first transceiver unit, a cable connecting the first transceiver unit to the signal processing device, wherein the first transceiver unit comprises:

a housing;

a first pair of transducers located at, or adjacent, a first end of the housing;

a second set of transducers located at, or adjacent, an opposite end of the housing.

The apparatus may include at least one further transceiver unit and at least one respective cable connecting the at least one further transceiver unit to the first transceiver unit (or to another of the at least one further transceiver units) in a daisy chain configuration.

The first pair of transducers of a said transceiver unit may comprise a said transducer configured to transmit signals at a first frequency and another said transducer configured to receive signals at the first frequency and at a second frequency. The second pair of transducers of a said transceiver unit may comprise a said transducer configured to transmit signals at the second frequency and another said transducer configured to receive signals at the first and the second frequency.

The signal processing device may be configured to implement a COFDM modulation scheme.

The first transceiver unit may be configured to invert an output signal so that coherent noise with respect to an adjacent connected said transceiver unit at least partially cancels (and so that incoherent signals may add). The coherent noise may result from coupling between one of the transducers in the first pair of the transceiver unit that functions as an inactive half-duplex transmitter and one of the transducers in the second pair of the transceiver unit that functions as an active half-duplex receiver.

The signal processing device may be configured to overdrive the signal for transmission in order to clip peaks of the signal.

The signal processing device may include a transmitter subsystem and a receiver subsystem. The signal processing device may be configured to switch off at least part of the transmitter subsystem whilst the receiver subsystem is operating. A switch, e.g. a JFET switch, may be used to isolate a final output amplifier of the transmit subsystem. A further switch, e.g. a second JFET, may be used to short circuit a feedback resistor of the transmit subsystem.

The apparatus may include at least one low noise component.

The communication apparatus may be configured, in use, to communication with a second communication apparatus comprising:

at least one transceiver unit configured to communicate with a second signal processing device.

The at least one transceiver unit of the second communications apparatus may comprise:

a first pair of transducers including a said transducer configured to transmit signals at the first frequency and another said transducer configured to receive signals at the first frequency, and a second set of transducers including a said transducer configured to transmit signals at the second frequency and another said transducer configured to receive signals at the second frequency.

According to another aspect of the present invention there is provided a communications system including communications apparatus and second communications apparatus substantially as described herein. According to another aspect, the invention provides a signal processing device substantially as described herein. According to yet another aspect, the invention provides a transceiver unit substantially as described herein.

According to yet another aspect of the present invention there is provided a mandrel including, or connected to, at least some components of a communications apparatus substantially as described herein. According to yet another aspect of the present invention there is provided a riser including, or connected to, at least some components of a second communications apparatus substantially as described herein.

According to another aspect, the invention provides a transceiver unit comprising:

a housing member;

a first pair of transducers located at, or adjacent, a first end of the housing member, and a second set of transducers located at, or adjacent, an opposite end of the housing member.

According to a further aspect, the invention provides a communication method comprising:

using a cable to connect a first transceiver unit to a signal processing device configured to receive a signal from the first transceiver unit and to produce a signal for transmission by the first transceiver unit, wherein the first transceiver unit comprises: a housing; a first pair of transducers located at, or adjacent, a first end of the housing, and a second set of transducers located at, or adjacent, an opposite end of the housing, and using the connected first transceiver unit to communicate with a remote transceiver unit.

A said transducer in the first subset may transmit on a first channel having an associated first frequency, and a said transducer in the second subset may transmit on a second channel having a second, different associated frequency.

The first signal processing device may be configured to produce the signal so that the signal is transmitted on the first channel by the first subset of transducers in the first set, and transmitted on the second channel by the second subset of transducers in the first set.

The first subset and the second subset of said transducers in the first set may be arranged in an interleaved manner, e.g. spaced apart in a line on/along a first member. A said transducer in the first subset may be spaced apart from an adjacent said transducer in the second subset by a regular distance.

The transducers in the second set may be configured to receive the signals transmitted on the first channel and the second channel.

The second signal processing device may select a best channel based on an error correction metric for data frames comprising the signals. The error correction metric may comprise a Viterbi bit error correction metric.

The transducers in the second set may include a first subset of the transducers and a second subset of the transducers.

The transducers in the first subset of the second set may be arranged in a first radial arrangement, e.g. a full or partial ring/loop around a second member. The transducers in the second subset of the second set may be arranged in a second radial arrangement around the second member, the first and the second radial arrangement being spaced apart axially.

The transducers in first subset of the second set may be configured to transmit the signal on the first channel to the first set of transducers. The transducers in the second subset of the second set may be configured to transmit the signal on the second channel to the first set of transducers.

In some embodiments, a transceiver unit (for the second set) may comprise a first pair of transducers of the first subset and a second pair of transducers of the second subset. One said transducer in the first pair may be configured to transmit and another said transducer in the first pair may be configured to receive. One said transducer in the second pair may be configured to transmit and another said transducer in the second pair may be configured to receive.

The transducers in the first set may be configured to receive the signals transmitted by the transducers in the second set on the first channel and the second channel.

The first signal processing device may be configured to process the signals received by the transducers in the first set on the first channel and the second channel in order to select a best channel from amongst the first and the second channels that is used to produce a first signal processing device output.

The first channel and the second channel may be centred on a predetermined intermediate frequency.

The first signal processing device and the second signal processing device may implement a COFDM modulation scheme for transmitting/receiving the signals.

The first (and/or the second) signal processing device may include a set of common transmitter components that can be used to partially produce the signal that is transmitted on the first channel by the first subset of transducers in the first set, and also to partially produce the signal that is transmitted on the second channel by the second subset of transducers in the first set. The common transmitter components may include a frame processor, an RS encoder, a codeword interleaver, a randomiser, a convolutional encoder and/or an OFDM modulator.

The first (and/or the second) signal processing device may include a set of common receiver components that can be used to partially process the signal that is received on the first channel (by the first/second subset of transducers in the first/second set), and also to partially process the signal that is received on the second channel (by the first/second subset of transducers in the first/second set). The common receiver components may include a codeword de-interleaver, an RS decoder and/or a frame processor.

A said transducer in the first set may convert the signal received from the first signal processing device so that the signal is transmitted acoustically. The transducers in the second set may convert the signal transmitted acoustically by a said transducer in the first set into an electrical signal for the second signal processing device.

The first signal processing device may receive an input signal and process the input signal to produce the signal. The input signal may be received from at least one sensor. The sensor may measure temperature or fluid flow characteristics.

An output of a said signal processing device may be used to control another device, e.g. a motor.

In use. the first set of transducers may be connected to a first member. In use, the second set of transducers may be connected to a second member. In use, at least one of the first and the second members may be moveable relative to one another. The first member may comprise (or be connected to) a mandrel. The second member may comprise (or be connected to) a conduit or riser in which the mandrel may be at least partially located in use. A medium, e.g. fluid, such as water, may, in use, be present or flow, between the first member and the second member (of the first and second sets of transducers).

According to another aspect of the present invention there is provided signal transmitting apparatus comprising:

a signal processing device configured to produce a signal for transmission by at least some transducers in a first set of said transducers to transducers in a second set of transducers.

According to another aspect of the present invention there is provided signal receiving apparatus comprising:

a signal processing device configured to receive signals from at least some transducers in a set of transducers and to process the received signals in order to select a best said signal that is used to produce an output from the signal receiving device.

According to another aspect of the present invention there is provided a transceiver unit configured to operate with signal transmitting apparatus, signal receiving apparatus and/or a communications system substantially as described herein. According to yet another aspect there is provided a set of transceiver units substantially as described herein.

According to yet another aspect of the present invention there is provided a method of transmitting and/or receiving data in a communication system substantially as described herein.

According to another aspect of the present invention there is provided computer readable medium storing a computer program to operate a method substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
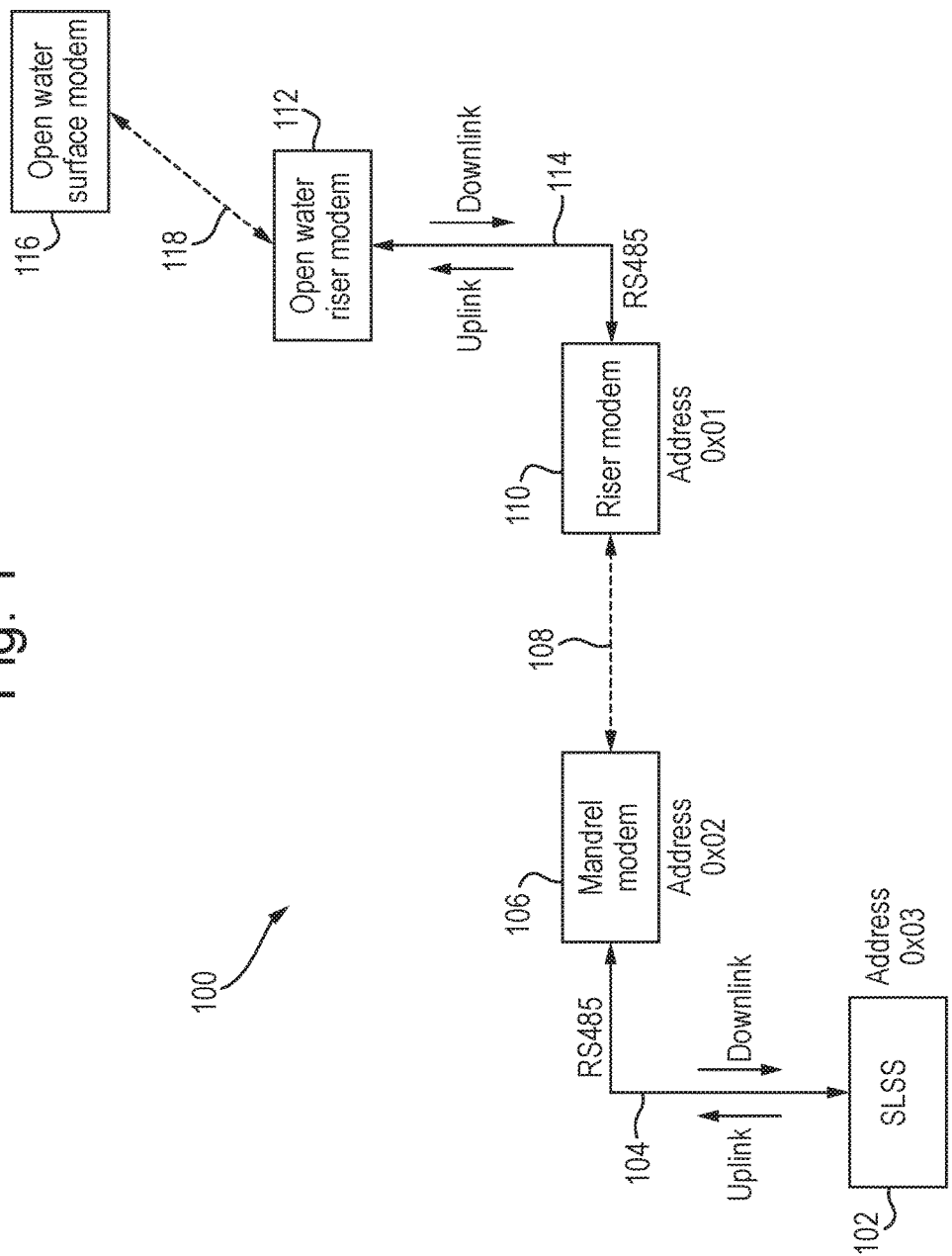
FIG. 1 is a schematic overview of an example communication system including first and second data processing devices that are in communication via an acoustic link provided by various sets of transducers.

Referring to FIG. 1, a schematic overview of an example communication system 100 is shown. The example system comprises a Subsea Landing String System (SLSS) 102 that communicates via an RS485 link 104 with a modem 106 located on a mandrel. An acoustic link 108 provided by transducers (not shown in FIG. 1) allows communication between that modem and another modem 110 located on a riser. The riser modem is in communication with an open water riser modem 112 via an RS485 link 114. That open water riser modem is in communication with a further open water surface modem 116 via an open water link 118.

In the example system, the RS485 is a half-duplex communications link using the known MODBUS serial transmission Remote Terminal Unit (RTU) protocol, operating in unicast mode with matching requests and replies. The RS485 link is set for 19200 baud, even parity, 1 start and 1 stop bit. In a typical example operation, the open water surface modem 116 can request data from the SLSS 102 (e.g. a temperature, fluid flow rate or other characteristic measurement taken by a sensor that is on board (or is in communication with) the SLSS), with the request being transferred via the illustrated components and links in sequence, and the response data being transferred back in a reverse manner.

It will be appreciated that the illustrated communication system's application, links and components are exemplary only. In general, the communications system may include any configuration of data processing components that include/use transducers, typically (but not limited to) ones that can communicate via acoustic links through fluid. Generally, the system will need to provide communication between a first data processing device that is associated with at least one transducer, and a second data processing device that is associated with its own transducer(s). Each transducer may be connected to a member that may or may not be moveable relative to one another. The communication may be unidirectional or bidirectional.

Figure 2:
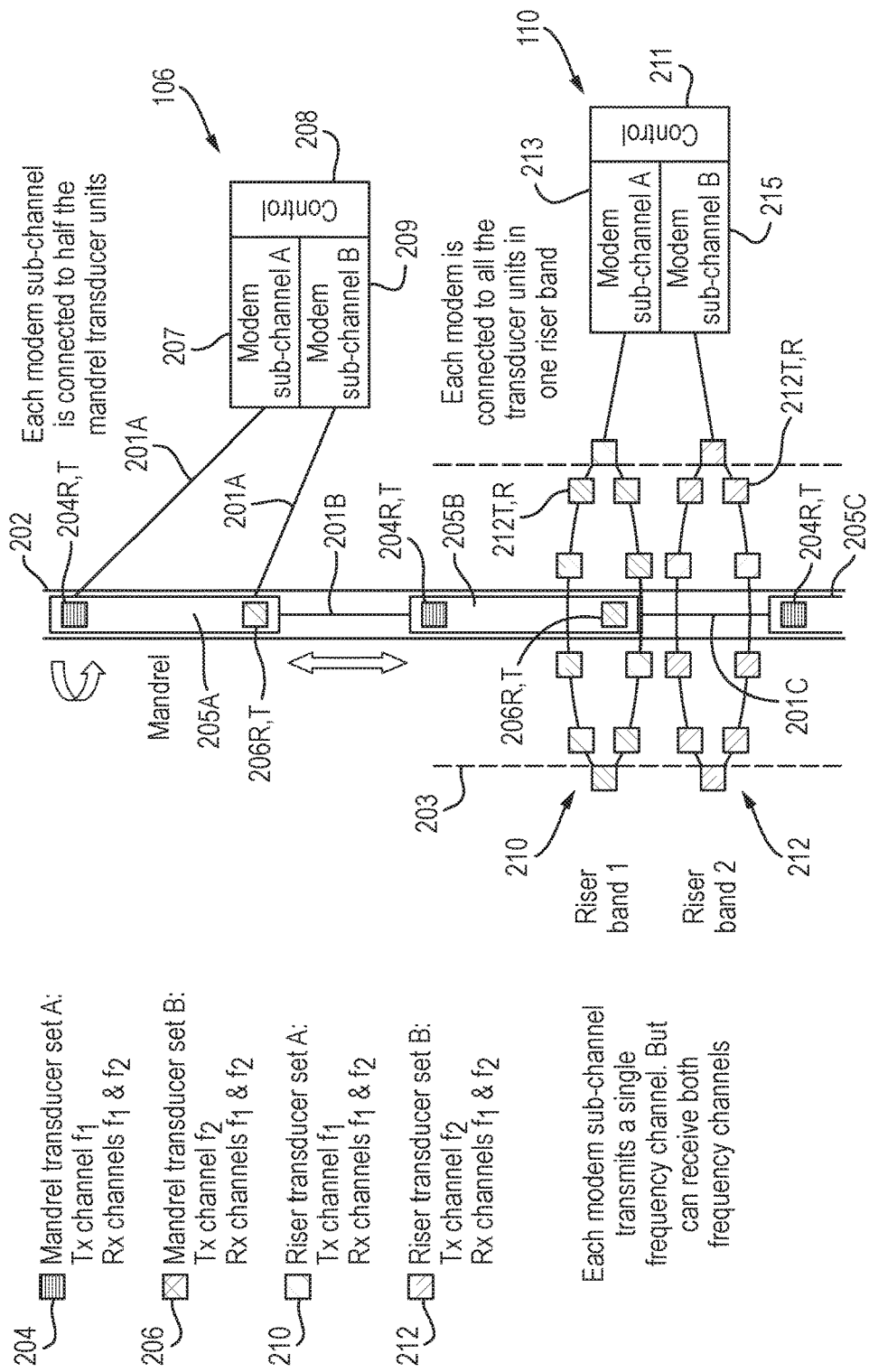
FIG. 2 details parts of the system including the first and second data processing devices and the transducer sets.

FIG. 2 shows the mandrel modem 106, the riser modem 110 and associated components in more detail.

The mandrel modem 106 is in communication with a first set of transducers (not detailed in FIG. 1) that are connected to the mandrel 202. The mandrel modem may be connected to the mandrel itself or to another body. The transducers in this first set are contained in a plurality of transceiver units 205A, 205B, 205C mounted along a 10 m straight length of the external surface of the mandrel. It will be understood that the precise number and arrangement of the transceiver units can vary, but typically there will be regular spacing between adjacent pairs of transducers/transceiver units. The connection of the transducers to the mandrel may be achieved by any suitable means, e.g. waterproof adhesive, fixings, etc, or the mandrel (or part thereof) may be manufactured with the transducers as integral parts.

In the example embodiment the first set of mandrel transducers is divided into first 204 and second 206 subsets. The mandrel modem 106 provides a first sub channel 207 so that the first subset 204 of transmit transducers are configured to transmit on a first frequency $f_1$. The mandrel modem also provides a second sub channel 209 so that the second subset 206 of transmit transducers are configured to transmit on a second, different frequency $f_2$. The receive transducers of the first subset and the second subset can receive on both frequencies $f_1$ and $f_2$.

Each transceiver unit 205 comprises a housing, typically in the form of a rectangular box having front, back, first end, opposite end, first side and opposite side surfaces, although it will be appreciated that the dimensions and design can be varied. There is a pair of transducers at/adjacent each (opposing) end of the transceiver unit: one transducer in the pair functioning as a transmitter and the other transducer in the pair functioning as a receiver. The pair of transducers at one end will normally be in the first subset and the pair of transducers at the other end in the second subset. For example, the transceiver unit 205A comprises a transducer pair 204T, 204R (of the first subset) at one end, and a transducer pair 206T, 206R (of the second subset) at its other end. Thus, in the example system, the first 204 and second 206 subsets of the mandrel transducers are arranged in a line as two interleaved groups along the mandrel. Each transducer may be manufactured from a single piezoelectric element, although in other embodiments, different types of transducers may be used. Each transducer may have an associated amplifier.

The mandrel modem 106 is connected to a first of the transceiver unit 205A by means of a first cable 201A. For ease of illustration, the cable 201A is illustrated by means of two lines in the Figure, but it will be understood in practice that a single cable may extend between the modem and the transceiver unit, which may be split and connected to each transducer 204T, 204R, 206T, 206R within the unit.

The first transceiver unit 205A is connected to the second transceiver unit 205B by means of a second cable 201B. That second transceiver unit is connected to a third transceiver unit 205C by means of a third cable 201C. Thus, the mandrel modem 106 is connected to a "daisy-chain" of transceiver units by means of respective cables. It will be understood that the number and arrangement of transceivers/cables is exemplary only and in other embodiments different numbers and/or arrangements of transceivers/cables could be used. Further, all the transceivers/cables need not be of exactly the same type/design. In other applications, the communication may be via wired medium. In alternative embodiments at least part of the functionality of the modems described herein may be implemented by components integral with a transducer transceiver (or transmitter/receiver) unit.

The mandrel modem 106 can include a controller 208 including components as described below, and may receive at least one input from at least one external device, e.g. a temperature sensor. Such an input can form the basis of a signal to be transmitted by the modem. Output produced as a result of signal processing by the mandrel modem may be processed internally, or stored and/or transferred as finalised data for further processing by another device. In some cases, the output produced by a component of the system may be used to control a device, such as a motor.

Although the detailed example described herein uses two subsets of transducers, with each subset being configured to transmit on a different frequency, it will be understood that variations are possible in other embodiments. For example, more than two subsets of transducers could be provided, with the processing of the system being modified to select a best link from between the three subsets. Alternatively or additionally, the transducers in a particular subset could share a distinguishing characteristic other than a common transmission frequency that can be used as part of a link selection process.

The riser modem 110 is connected to a second set of transducers that are connected to the riser 203. Again, the communication and connection means can comprise any suitable technology. In the example embodiment this second set of riser transducers is divided into first 210 and second 212 subsets. The first 210 and second 212 subsets of riser transducers are arranged in the form of first and second, respectively, closely spaced bands/loops/rings on the external surface of the riser 203. Although not fully illustrated for reasons of clarity, a transceiver unit mounted on the riser will comprise one pair of transducers in the subset 210 and a corresponding (in terms of radial position) pair of transducers in the subset 212. For example, the transducer pair labelled 210T, 210R and the transducer pair labelled 212T, 212R can be located at opposing ends of one riser transceiver unit. Other riser transceiver units are not labelled in this way in the Figure.

The riser modem 110 provides a first sub channel 213 so that the first subset 210 of riser transmit transducers are configured to transmit on a first frequency $f_1$ (which, in the example embodiment, is the same as the frequency $f_1$ used by the first subset 204 of the mandrel transducers). The riser modem also provides a second sub channel 215 so that the second subset 212 of riser transmit transducers are configured to transmit on the second frequency $f_2$ (which, again, in the example embodiment, is the same as the frequency $f_2$ used by the second subset 206 of the mandrel transducers). The receive transducers of the first subset and the second subset can receive on both frequencies $f_1$ and $f_2$.

The use of the two modem sub-channels on both the mandrel 202 and riser 203 allows greater separation of interfering transducers. The riser modem 110 can include a controller 211 including components as described below, and may receive at least one input from at least one external device. Output produced by the riser modem may be processed internally, or stored and/or transferred for further processing by another device, e.g. a remote device that is in communication with the open water surface modem 116.

It will be understood that the illustrated arrangement of transducers is exemplary only and alternatives are possible, e.g. in some cases a different arrangement, e.g. open loop or grid, may be used. Similarly, in the case where more than two different frequencies are used in the system, a corresponding number of subsets/groups can be provided.

As illustrated by the arrows in FIG. 2, during docking, as the mandrel 202 is lowered into the riser 203, several transducers 204, 206 on the mandrel address several transducers 210, 212 on the riser, whilst rotation of the mandrel about its axis is uncontrolled. Fluid will usually surround/flow between the mandrel and the riser. Individual transceiver units provide communications coverage for approximately +/−20° rotation and +/−80 mm linear relative motion. A ring of up to 10 units in each riser band/subset 210, 212 can provide 360° coverage and 30 mandrel transceivers in each of the interleaved arrays 204, 206 on the mandrel can provide a large linear operational range (up to 10 m). This can allow the example system to start communicating around 10 m above final fixed/docked position and does not require angular alignment.

The two sub-channels 207, 209; 213, 215 in both the mandrel 106 and the riser 110 modems can be combined into a single hardware unit. As will be described below in more detail, a logical connection between the two sub-channels can be used on the receive side to select the data with the best performance.

The use of two interleaved mandrel transducer groups can accommodate the use of Frequency Division Multiple Access (FDMA) with two frequency channels, one for each group. This allows greater separation of interfering transducers to overcome the problem of modems receiving signals with both positive and negative Doppler during the mandrel docking procedure and to reduce the effect of nulls introduced by the severe multi-path environment. The two channels can be centred on a chosen Intermediate Frequency (IF), based on the characteristics of the transducers and/or operating environment, e.g. fluid type/density. The same data is transmitted on both frequencies, but the link is made by different transducers. In both communications directions, individual transducers transmit on a single frequency channel ($f_1$ or $f_2$) and receive on both channels ($f_1$ and $f_2$). It will be understood that in alternative embodiments, e.g. ones that do not use a request/response protocol, the data transfer could be unidirectional, e.g. from the mandrel to the riser only.

Although multiple frequencies are used in the example embodiment, the overall communications channel will be half-duplex and therefore there will still be Time Division Multiplexing (TDM) between the two communication directions. This can remove the problem of using simultaneous transmit and receive frequencies and the problems of the transmitted signals swamping the receiver.

Figure 3:
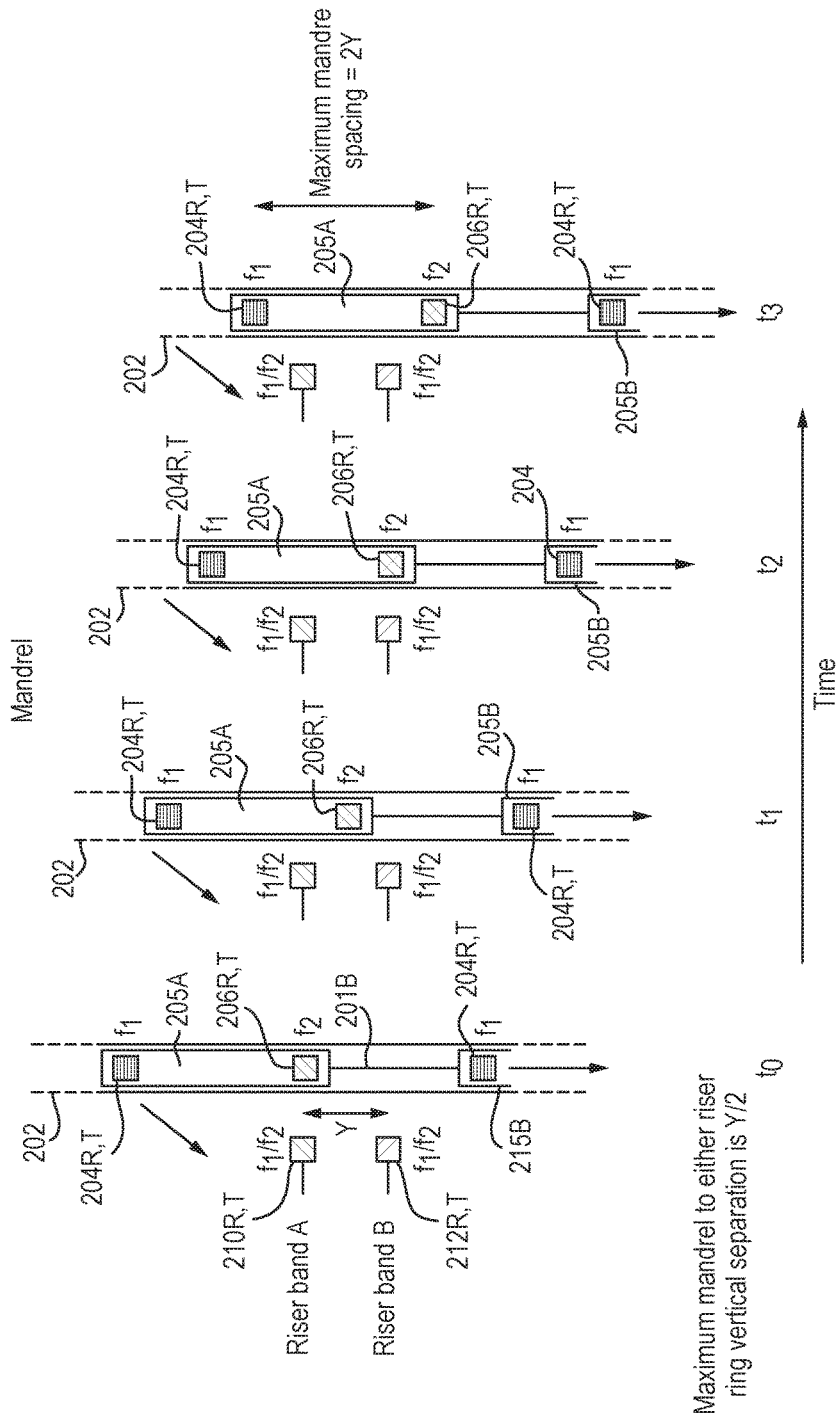
FIG. 3 schematically illustrates data transfer from the first data processing device and its associated transducer sets to the second data processing device and its associated transducer sets.

FIG. 3 schematically illustrates communication in the mandrel 202 to riser 203 direction as the mandrel is lowered. It also illustrates the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the mandrel transducers are separated into two interleaved subsets/groups 204, 206 (within transceiver units 205) along a length of the mandrel 202.

Each subset transmits on only one of the frequencies $f_1$ or $f_2$. The two riser modem sub-channels 213, 215 receive both frequencies $f_1$ and $f_2$ via the bands/subsets 210, 212 of riser transducers. This can overcome the problem of two transducers at the same range with opposite Doppler, as it is assumed that for the frequency forming the best link, only a maximum of one transducer from that subset makes any significant contribution to the communications channel at any particular time due to spatial separation and the associated propagation attenuation.

Figure 4:
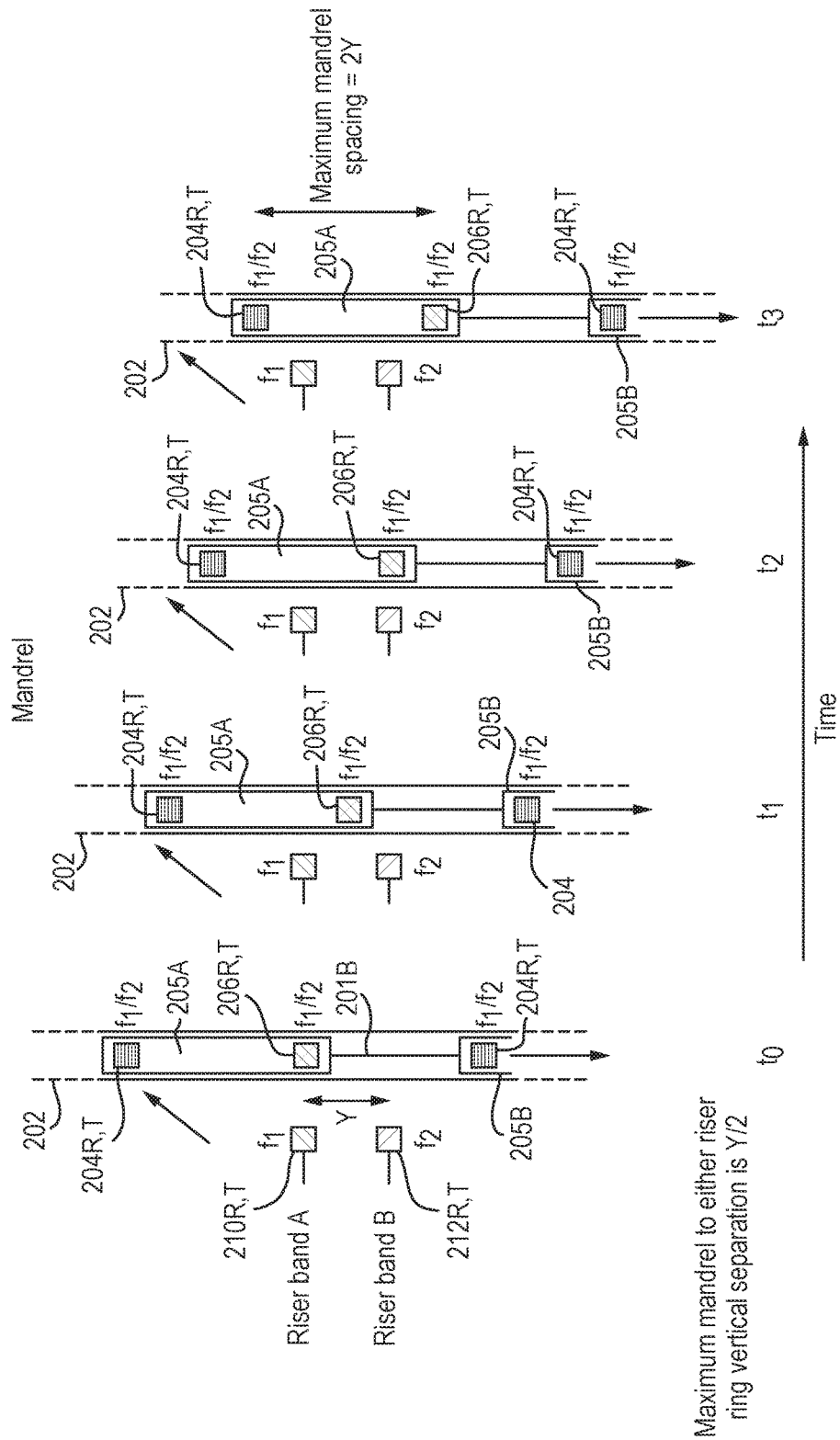
FIG. 4 schematically illustrates data transfer from the second data processing device and associated transducer sets to the first data processing device and associated transducer sets.

FIG. 4 schematically illustrates communication in the riser 203 to mandrel 202 direction. It also shows the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the riser transducers transmit on different frequency channels $f_1$ or $f_2$ from each riser band/subset 210, 212, respectively. The mandrel modem 106 receives on both frequency channels $f_1$ and $f_2$ via the mandrel transducers in the respective subsets 204, 206.

Demodulating two channels is achieved by splitting the channels in the digital processing performed by the modems 106, 110. Although this requires extra digital processing power (approaching double that of a single channel), it has a number of significant advantages in terms of system and communications performance, including:

It is required for the riser to mandrel direction to overcome the Doppler problem It allows the greatest spatial separation of interfering transmissions from other transducers using the same channel Transmitting on a single frequency channel gives the best performance, as all the signal power may be dedicated to a signal channel Modems for the mandrel and riser have common functionality The use of separate frequencies and the different positioning of the transducers can reduce the possibility of nulls in one part of the system.

Figure 5:
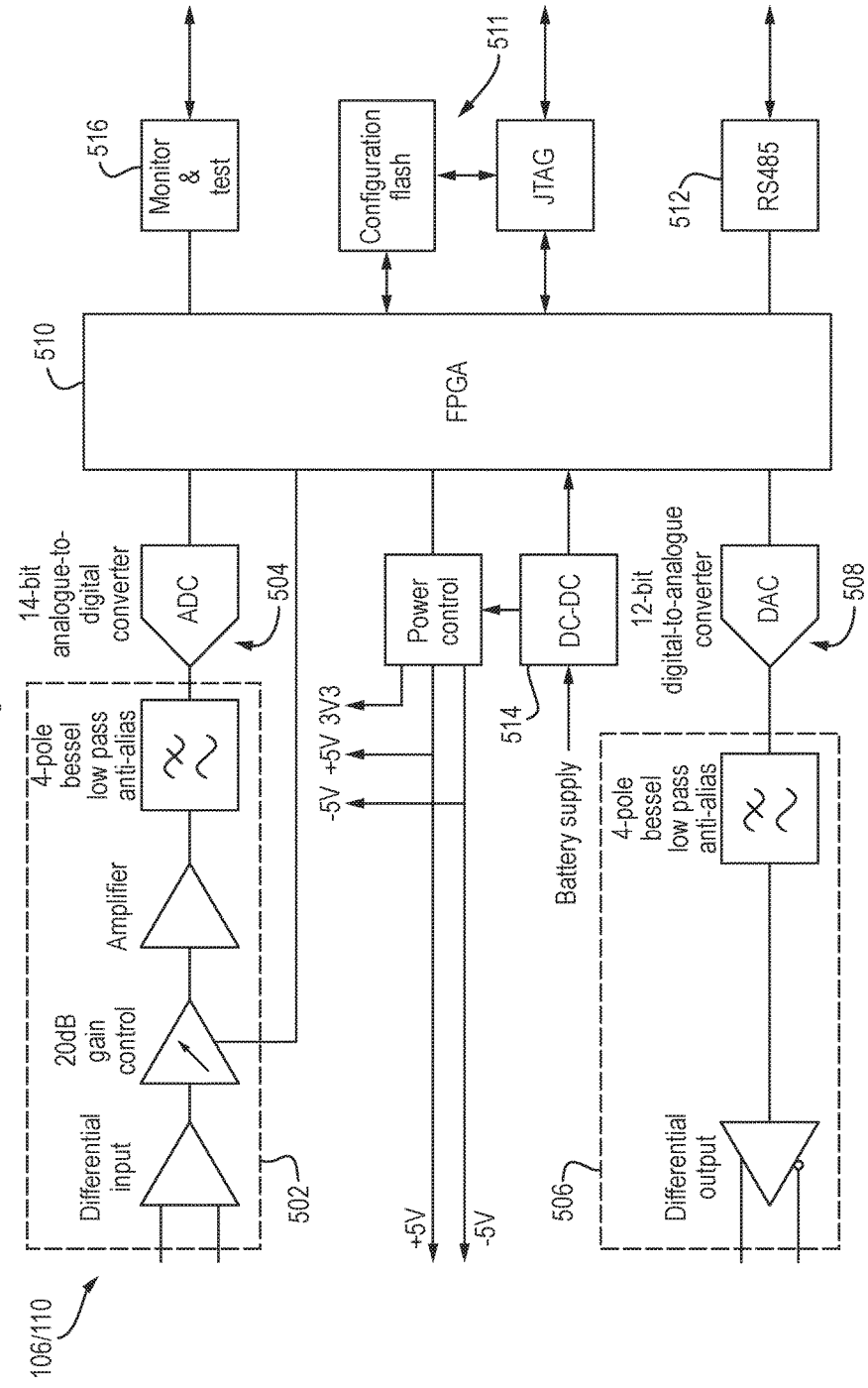
FIG. 5 is a block diagram of one of the data processing devices.

FIG. 5 shows an example of the electronic components used for the mandrel 106 or riser 110 modem. The example modem comprises: an analogue front end 502; analogue to digital converter 504; analogue back end 506; digital to analogue converter 508; FPGA 510 and supporting configuration components 511; RS485 interface 512; DC-DC converters and power control 514, and monitoring and test interfaces 516. The analogue front end 502 and back end 506, as well as the ADC converter 504 and the DAC converter 508, are each duplicated, one for each of the two transceivers subsets 204, 206; 210, 212 on the mandrel 202 and the riser 203.

The example modem design is based on a Coded Orthogonal Frequency Division Multiplex (COFDM) approach. COFDM provides a rugged solution to transmitting digital data at high rates through an environment where multipath signals with different times of arrival produce significant signal interference.

Figure 6:
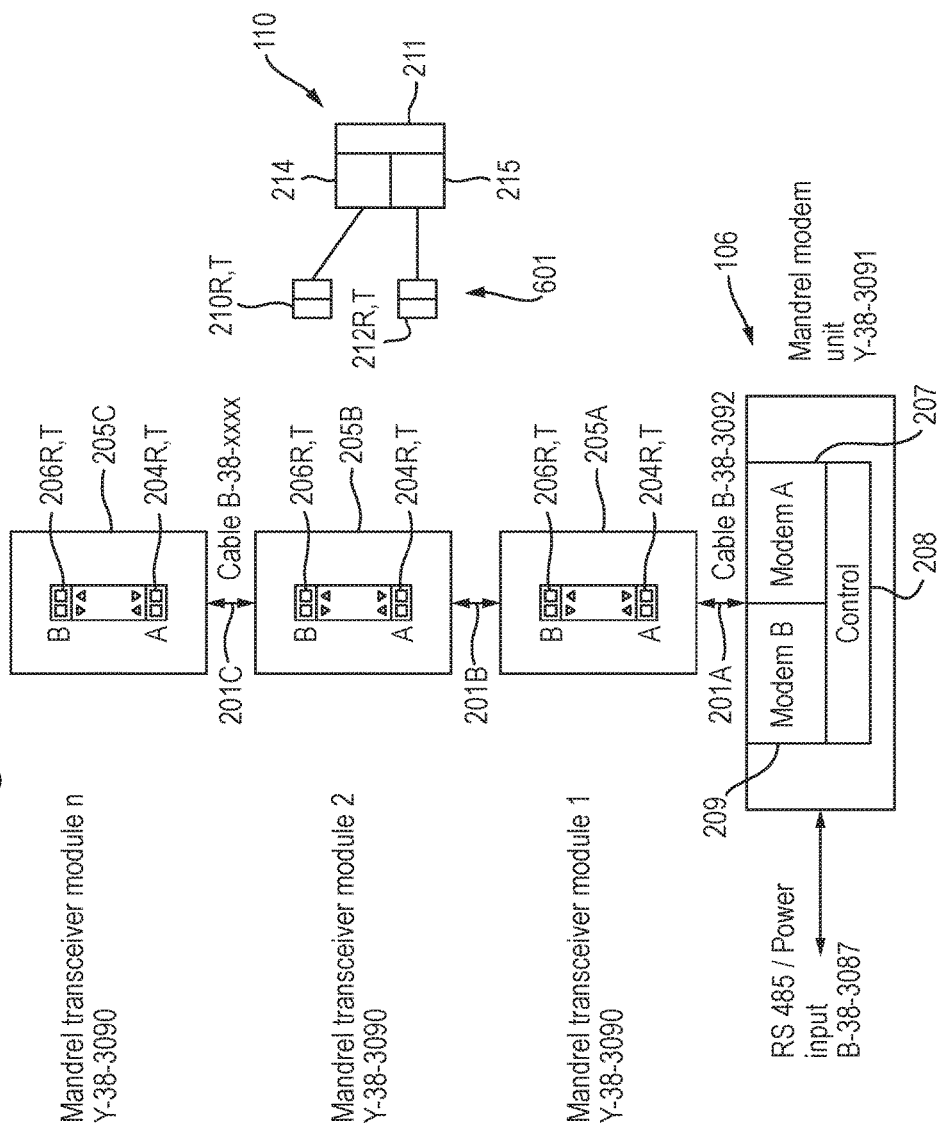
FIG. 6 schematically shows the first data processing device and its set of transducers in a daisy-chain configuration.

FIG. 6 is an alternative schematic view of how the mandrel modem 106 is connected in a daisy chain arrangement to the transceiver units 205A-205C by means of the cables 201A-201C. The Figure also schematically shows the riser modem 110 and one (only) example riser transceiver unit 601. The riser transceiver unit comprises transducer pair 210T, 210R (of the first riser subset) and another transducer pair 212T, 212R (of the second riser subset). In use, these components can provide an acoustic link through the fluid between the mandrel and the riser.

In practice, the present inventors found that noise from the inactive half-duplex transmitter of one transducer pair (204T, for example) coupling strongly with the active half-duplex receiver of the other transducer pair (204R, for example) resulted in an unacceptable signal-to-noise level. This coupling is stronger than the coupling between the transducer 204R on the mandrel and the corresponding transducer 210T on the riser. The inventors therefore devised several ways of eliminating/mitigating noise.

One devised way of reducing the noise involves inverting the signal from each mandrel transceiver unit 205 so that coherent noise cancels. The inverting inputs of the op amp in the transceiver unit can be used for this purpose. Subtracting the output from successive transceiver units in the daisy-chain minimises the overall noise as coherent noise caused by either modem output noise and the strong coupling S illustrated in FIG. 6 and will generally cancel with an even number of transceiver units, whereas signals from adjacent transceiver units on the riser, which are likely to be incoherent (due to different time delays), will be additive.

The strong coupling S will be in phase as this signal is generated by the design of the transducer and mounting structure, resulting in some of the generated signal reflecting from the front and back faces of the housing of the transceiver unit into the adjacent receiver transducer within the transceiver unit. This results in a repeatable signal with a fixed time delay on each receiver of the transceiver unit. In practice, as each transducer will have slightly different performance characteristics the noise will normally not totally cancel, but the total noise level will be much less than if they were all added.

Another devised way of increasing signal-to-noise ratio involves overdriving the mandrel modem 106 (and reducing transceiver gain) in order to maximise the detected signal.

The COFDM coding method used by example embodiments of the system results in an output signal with a very large peak to RMS signal ratio, i.e. peak signal levels are used infrequently. By modifying the drive code in the FPGA of the mandrel modem 106 it is possible to increase the RMS signal level used whilst limiting the maximum drive voltage levels without affecting system performance.

COFDM signals have a large peak to mean ratio and it is possible to clip the peaks without significant degradation to the performance. Therefore, the signal processing device 106 may be configured to overdrive the transmitted signal such that clipping occurs in order to increase the average transmitted signal power and hence the overall signal to noise ratio. A 6 dB increase in RMS drive level has been incorporated into an example design, resulting in a measured improvement of 4-5 dB in signal-to-noise ratio. This will have the greatest effect when the mandrel and riser transceiver units are misaligned, increasing the range of each transceiver unit and reducing the number of transceiver units required in both the mandrel and riser subsystems, which, in turn, reduces the overall system noise levels and improving system performance (bit error rate and data rate).

Yet another devised way of reducing noise involves switching the transmitter signal of a modem 106/110 during the listening part to ground to minimise any directly coupled acoustic sound from the transmitter.

Figure 7:
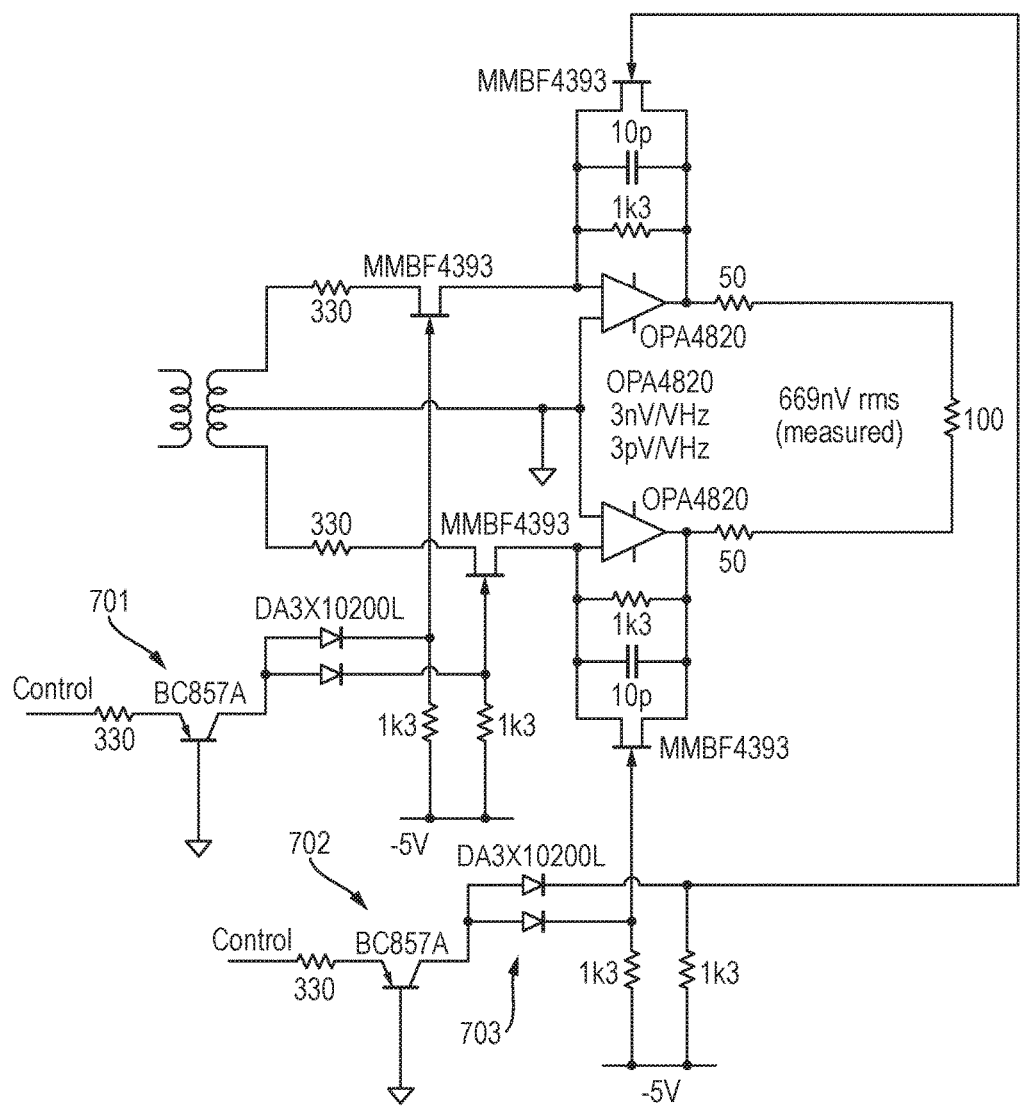
FIG. 7 is a circuit diagram of an example transmit subsystem of the first data processing device.

An example of a modified transmit output stage circuit schematic (which can be implemented as the analogue back end 506 of FIG. 5) is shown in FIG. 7. In order to minimise the inactive transmitter output noise the output of the modem 106/110 was disabled. An alternative approach would be to turn off the power to the output stage; however, this would need to cycle the power once every 0.4 seconds. This might impact the reliability of the components, or how fast the amplifier would respond. Therefore, the inventors chose to isolate the final output amplifiers from the DAC 508 output using at least one JFET switch 701, which reduces the output noise to that of the final amplifier stage; this is the combination of op-amp input voltage and current noise, Johnson noise from the resistors and power supply noise.

A further reduction in output noise can be achieved by using a second JFET 702 to short circuit the feedback resistor 703, reducing the contribution of the current noise and Johnson noise. The power supply rejection ratio of the OPA4820 at 1 MHz is better than 40 dB but power supply noise may still be problematic.

The above modifications can reduce the measured noise at the output of the modem by 27 dB.

Yet another way of reducing noise involves using generally low noise components in the system.

It will be understood that embodiments of the communication apparatus can include any combination of one or more of the noise-reduction techniques described herein (i.e. subtracting outputs from successive stages and/or overdriving and/or switching transmitter signal on/off and/or using low noise components, possibly in combination with further measures).

It will be apparent to the skilled person that the examples described herein can be combined or adapted in various ways to satisfy the needs of any particular application.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communication apparatus comprising:
    a first transceiver unit including:
        a housing member having a first end and a second end opposite the first end,
        a first pair of transducers located at or adjacent to the first end of the housing member, and
        a second pair of transducers located at or adjacent to the second end of the housing member;
    a signal processing device configured to receive a signal from the first transceiver unit and to produce a signal for transmission by the first transceiver unit; and
    a cable connecting the first transceiver unit to the signal processing device,
    wherein one of the transducers in the first pair of transducers functions as an inactive half-duplex transmitter and one of the transducers in the second pair of transducers functions as an active half-duplex receiver.

2. The apparatus according to claim 1, including a second transceiver unit and at least one cable connecting the second transceiver unit to the first transceiver unit in a daisy chain configuration.

3. The apparatus according to claim 2, wherein:
    the first pair of transducers of a said transceiver unit includes a said transducer configured to transmit signals at a first frequency and another said transducer configured to receive signals at the first frequency and at a second frequency, and
    the second pair of transducers of the transceiver unit includes a said transducer configured to transmit signals at the second frequency and another said transducer configured to receive signals at the first frequency and at the second frequency.

4. The apparatus according to claim 1, wherein the signal processing device is configured to implement a coded orthogonal frequency division multiplex (COFDM) modulation scheme.

5. The apparatus according to claim 2, wherein the first transceiver unit is configured to invert an output signal that at least partially cancels coherent noise with respect to the second transceiver unit.

6. The apparatus according to claim 4, wherein the signal processing device is configured to overdrive the signal for transmission in order to clip peaks of the signal.

7. The apparatus according to claim 1, wherein the signal processing device includes a transmitter subsystem and a receiver subsystem, and wherein the signal processing device is configured to switch off at least part of the transmitter subsystem whilst the receiver subsystem is operating.

8. The apparatus according to claim 7, wherein at least one switch is used to isolate a final output amplifier of the transmitter subsystem.

9. The apparatus according to claim 8, wherein the at least one switch includes a JFET switch.

10. The apparatus according to claim 8, including a further switch configurable to short circuit a feedback resistor of the transmitter subsystem.

11. The apparatus according to claim 3, configured, in use, to communicate with a second communication apparatus including:
- at least one transceiver unit configured to communicate with a second signal processing device, wherein the at least one transceiver unit of the second communications apparatus includes:
  - a first pair of transducers including a said transducer configured to transmit signals at the first frequency and another said transducer configured to receive signals at the first frequency, and
  - a second pair of transducers including a said transducer configured to transmit signals at the second frequency and another said transducer configured to receive signals at the second frequency.

12. The apparatus according to claim 1, wherein the communications apparatus is at least partially connected to a mandrel.

13. A communication method comprising:
- using a cable to connect a first transceiver unit to a signal processing device configured to receive a signal from the first transceiver unit and to produce a signal for transmission by the first transceiver unit, wherein the first transceiver unit includes:
  - a housing member having a first end and a second end opposite the first end;
  - a first pair of transducers located at or adjacent to the first end of the housing member, and
  - a second pair of transducers located at or adjacent to the second end of the housing member; and
- using the connected first transceiver unit to communicate with a remote transceiver unit,
- wherein one of the transducers in the first pair of transducers functions as an inactive half-duplex transmitter and one of the transducers in the second pair of transducers functions as an active half-duplex receiver.

14. A communication apparatus comprising:
- a first transceiver unit including:
  - a housing member having a first end and a second end opposite the first end,
  - a first pair of transducers located at or adjacent to the first end of the housing member, and
  - a second set of transducers located at or adjacent to the second end of the housing member;
- a signal processing device configured to receive a signal from the transceiver unit and to produce a signal for transmission by the transceiver unit; and
- a cable connecting the transceiver unit to the signal processing device;
- wherein:
  - the first pair of transducers of the first transceiver unit includes a said transducer configured to transmit signals at a first frequency and another said transducer configured to receive signals at the first frequency and at a second frequency,
  - the second pair of transducers of the first transceiver unit includes a said transducer configured to transmit signals at the second frequency and another said transducer configured to receive signals at the first frequency and at the second frequency,
  - and one of the transducers in the first pair transducers functions as an inactive half-duplex transmitter and one of the transducers in the second pair of transducers functions as an active half-duplex receiver.

15. The apparatus according to claim 14, further comprising a second transceiver unit adjacent and connected to the first transceiver unit, wherein the first transceiver unit is configured to invert an output signal that at least partially cancels coherent noise with respect to the second transceiver unit.

16. The apparatus according to claim 14, wherein the signal processing device is configured to overdrive the signal for transmission in order to clip peaks of the signal.

17. The apparatus according to claim 14, wherein the signal processing device includes a transmitter subsystem and a receiver subsystem, and wherein the signal processing device is configured to switch off at least part of the transmitter subsystem whilst the receiver subsystem is operating.

18. The apparatus according to claim 17, wherein at least one switch is used to isolate a final output amplifier of the transmitter subsystem.

19. The apparatus according to claim 18, including a further switch configurable to short circuit a feedback resistor of the transmitter subsystem.

* * * * *